(12) United States Patent
Kokeguchi

(10) Patent No.: US 6,231,078 B1
(45) Date of Patent: May 15, 2001

(54) AIR BAG INFLATOR

(75) Inventor: Akira Kokeguchi, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/286,294

(22) Filed: Apr. 6, 1999

(30) Foreign Application Priority Data

Apr. 8, 1998 (JP) .................................................. 10-111367

(51) Int. Cl.$^7$ .................................................. B60R 21/26
(52) U.S. Cl. ......................... 280/736; 280/741; 280/742
(58) Field of Search ................................ 280/741, 742, 280/736, 737, 740

(56) References Cited

U.S. PATENT DOCUMENTS

| | | |
|---|---|---|
| 5,219,178 | 6/1993 | Kobari et al. ........................ 280/736 |
| 5,799,973 | 9/1998 | Bauer et al. . |
| 5,884,938 * | 3/1999 | Rink et al. ............................ 280/741 |
| 5,897,136 * | 4/1999 | Okada .................................. 280/737 |
| 6,086,094 * | 7/2000 | Stevens et al. ....................... 280/741 |

FOREIGN PATENT DOCUMENTS

| | | | |
|---|---|---|---|
| 512747 * | 11/1992 | (EP) | ..................................... 280/736 |
| 7-156741 | 6/1995 | (JP) . | |
| 9-136604 | 5/1997 | (JP) . | |

* cited by examiner

*Primary Examiner*—Eric Culbreth
(74) *Attorney, Agent, or Firm*—Kanesaka & Takeuchi

(57) ABSTRACT

An air bag inflator is divided into first and second gas chambers. The inflator starts to discharge gas by breaking a seal of the first gas chamber. As the pressure difference between the first gas chamber and the second gas chamber is increased, a disk closure situated between the first and second gas chambers is torn, so that gas is discharged also from the second gas chamber. The air bag inflator can be manufactured at a low cost and enables the air bag to be held in the deployed state for a relatively long period of time.

8 Claims, 2 Drawing Sheets

AIR BAG INFLATOR

BACKGROUND OF THE INVENTION AND RELATED ART STATEMENT

The present invention relates to an inflator which generates gas for inflating and deploying an air bag for protecting a vehicle occupant. In particular, the present invention relates to an air bag inflator suitable for an air bag for protecting a side of an occupant on a seat, which is improved in allowing the air bag to be held in its deployed state for a relatively long period of time by virtue of a plurality of high-pressure gas chambers.

An air bag inflator having a plurality of combustion chambers containing gas generating agents therein is known in U.S. Pat. No. 5,219,178 and Japanese Patent Unexamined Publication (KOKAI) No. H09-136604. In the air bag inflators disclosed in these publications, the volume of gas to be generated can be controlled in several modes thereby enabling the preferred deployment of the air bag to suitably correspond to the severity of the collision and the condition of the occupant.

An air bag inflator having a plurality of separate and sealed high-pressure gas chambers is also known, e.g. Japanese Patent Unexamined Publication (KOKAI) No. H07-156741.

However, there is a strong demand for an air bag inflator which can be manufactured at a low cost and enables the air bag to be held in its deployed state for a relatively long period of time.

The present invention has been made in order to satisfy the aforementioned demand, and an object of the present invention is to provide an air bag inflator, which can provide improved ability in protecting an occupant.

Another object of the invention is to provide an air bag inflator which can inflate the air bag quickly and keep the inflated condition of the air bag for a relatively long period of time.

Further objects and advantages of the invention will be apparent from the following description of the invention.

SUMMARY OF THE INVENTION

In order to solve the above-described problems, the present invention provides an air bag inflator for discharging gas for deploying an air bag. The inflator comprises a plurality of high-pressure gas chambers which are sealed; an initiator for staring to discharge gas by breaking the seal of the first high-pressure gas chamber; means for detecting a pressure difference between the first high-pressure gas chamber and the other high-pressure gas chamber and for discharging gas sequentially from the other high-pressure gas chamber by breaking the seal of the other high-pressure gas chamber due to the pressure difference.

In the initial stage of the deployment of the air bag, the air bag is deployed by gas ejected from the first high-pressure gas chamber. As the gas is discharged from the first high-pressure gas chamber, the inner pressure in the first high-pressure gas chamber falls. At this point, by using the means, for example, a disk closure which is disposed between the first high-pressure gas chamber and the other high-pressure gas chamber and can be torn when it is subjected to a predetermined pressure difference, gas is additionally discharged from the other high-pressure gas chamber sequentially. Therefore, the shrinkage of the air bag, which is caused by temperature fall of gas discharged from a first high-pressure gas chamber and/or air vent through a vent hole, can be compensated by supplying the additional gas, so that the deployment pressure, e.g. 0.3–0.6 kgf/cir, of the air bag can be held for a long period of time, e.g. 5–7 seconds. This can improve the performing ability of, for example a side air bag, for protecting the occupant.

According to the present invention, the aforementioned means is a disk closure which is disposed between the first high-pressure gas chamber and the other gas chamber and is torn when it is subjected to a predetermined pressure difference. This is because the means can be made by a quite simple structure, and a mechanism for delayed operation between the high-pressure gas chambers, which are divided, can be achieved at a low cost.

DETAILED DESCRIPTION OF PREFERRED EMBODIMENTS

Hereinafter, the present invention will be described with reference to the attached drawings.

Figure 1:
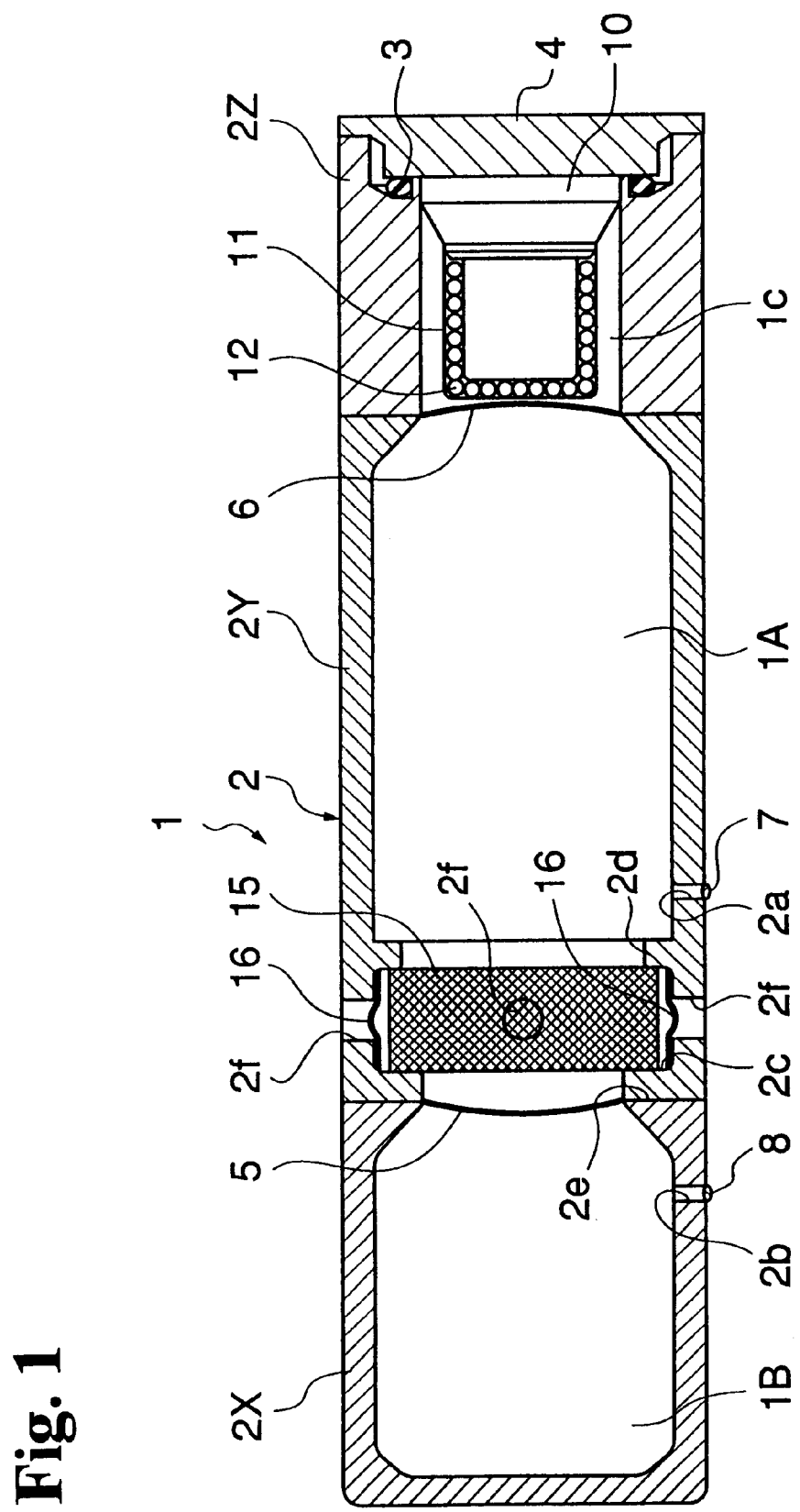
FIG. 1 is a sectional view of an air bag inflator of a pistonless type according to a first embodiment of the present invention.

FIG. 1 is a sectional view of an air bag inflator 1 of a piston-less type as a first embodiment of the present invention. The air bag inflator 1 comprises a body 2 having a space therein in which gas is filled and sealed. The body 2 has a cylindrical profile, and comprises three parts 2X, 2Y and 2Z arranged in the longitudinal direction. The left part 2X is a cylinder integrally formed with a bottom which is a left end wall of the body. The middle part 2Y and the right part 2Z are both hollow tubular cylinders. These three parts are arranged such that the ends of the middle part 2Y are in contact with the ends of the adjacent parts and are connected together by welding the ends along the outer peripheries. Each welded portion has a flange portion projecting inwardly. A base 4 is screwed into the right end of the body 2 via a gasket 3 so that the body 2 is sealingly closed by the gasket 3 and the base 4.

Disk closures 5, 6 are disposed between the left part 2X and the middle part 2Y, and between the middle part 2Y and the right part 2Z, respectively, inside the body 2. The disk closures 5, 6 are thin metal sheets, i.e. stainless steel with the thickness of 0.4 mm. The disk closures 5, 6 are sandwiched between the ends of the parts of the body 2, and are fixed by a well-known means such as welding. The inside of the body 2 is divided in three chambers by the disk closures 5, 6. Among the three chambers, gas is filled and sealed in a first gas chamber 1A positioned in the middle and in a second gas chamber 1B positioned on the left side of the first gas chamber 1A via the disk closure 5. The gas is an inert gas, such as argon and helium, having high pressure about 200–300 kgf/cm$^2$.

The body 2 is provided with injection holes 2a, 2b allowing the outside of the body 2 to communicate with the first and second gas chambers 1A, 1B, respectively. The high-pressure gas is injected through the injection holes 2a, 2b. Practically, the gas is injected at the same time in order not to cause pressure difference between the first gas chamber 1A and the second gas chamber 1B. Fitted in the injection holes 2a, 2b are steel balls 7, 8. After filling the gas, the steel balls 7, 8 are fitted in the injection holes 2a, 2b so as to close the injection holes 2a, 2b to seal the gas.

A chamber 1C positioned on the right side of the first gas chamber 1A via the disk closure 6 has an initiator assembly 10 disposed therein. When a vehicle comes into collision, the initiator assembly 10 receives an electric signal from a sensor (not shown) to ignite. The initiator assembly 10 is integrally fixed to the inner surface of the base 4 at a side facing the first gas chamber 1A when screwed. Therefore, when the base 4 is screwed into the right end of the body 2, the initiator assembly 10 is disposed inside the chamber 1C. An enhancer cap 11 is fitted to an end (left end in FIG. 1) of the initiator assembly 10. The enhancer cap 11 includes an enhancer, i.e. gas generating agent, 12 held inside thereof.

Inside the first gas chamber 1A, a screen 15 is disposed near the disk closure 5 at the left side. The screen 15 is made by forming a metal mesh material into a disk-like configuration having a predetermined thickness. The screen 15 is used for capturing cinders of the enhancer 12 and fragments of the disk closures 5, 6. The outer periphery of the screen 15 is fitted in a groove 2c formed along the inner periphery of the first gas chamber 1A. More particularly, projections 2d, 2e are formed on both sides of the groove 2c to project from the inner surface of the first gas chamber 1A. The width of the groove 2c between the projections 2d, 2e is set to correspond to the thickness of the screen 15. The screen 15 is fitted in or engaged with the groove 2C. Since the screen 15 is flexible, the screen 15 can be slightly deformed in the radial direction when the screen 15 is installed in the groove 2c.

Communication or discharge holes 2f are formed between the bottom of the groove 2c and the outer surface of the body 2. Four communication holes 2f are formed at predetermined intervals in the circumferential direction of the body 2. Although the communication holes 2f allow communication between the inside of the first gas chamber 1A and the outside of the body 2, the communication holes 2f are normally closed by disk closures 16 disposed on the bottom of the groove 2c. Each disk closure 16 is a circular sheet made of metal, such as stainless steel, and having a hemispherical convex portion at the middle thereof projecting toward the inside of the communication hole 2f. Each disk closure 16 contacts the bottom of the groove 2c in such a manner that the surface having the convex portion is directed to the communication hole 2f. The sealing between the disk closure 16 and the body 2 is accomplished by adhesion.

The description will now be made as regard to the operation of the air bag inflator 1 of the piston-less type structured as mentioned above.

When the vehicle comes into collision, the sensor (not shown) senses the collision and outputs an electric signal to the initiator assembly 10. By this electric signal, the initiator assembly 10 operates. The operation of the initiator assembly 10 ignites the enhancer (gas generating agent) 12 to generate high temperature and high pressure gas. The pressure of the generated gas destroys or blows away the enhancer cap 11. The impact pressure of the gas generated from the enhancer 12 tears the disk closure 6 in the first gas chamber 1A.

As the disk closure 6 is torn, the gas filled and sealed in the first gas chamber 1A at a high pressure expands due to the heat from the enhancer 12, and the gas pressure from the enhancer 12 is also added, whereby the inner pressure of the first gas chamber 1A is increased. By the increased inner pressure, the disk closures 16 disposed in the groove 2c to close the communication holes 2f are torn. As the disk closures 16 are thus torn, the communication holes 2f become the communicating state, so that the gas with high temperature about 150–200° C. is discharged into the air bag. Accordingly, the air bag, which has a capacity of about 5–15 liters, is immediately inflated with this high temperature gas.

As the gas is discharged from the inside of the first gas chamber 1A, pressure difference occurs between the inside of the first gas chamber 1A and the inside of the second gas chamber 1B, in which gas is filled and sealed, adjacent to the first gas chamber 1A via the disk closure 5 at the left side. When this pressure difference exceeds a predetermined value, the disk closure 5 is torn. As the disk closure 5 is torn, the gas within the second gas chamber 1B is discharged into the air bag through the communication holes 2f which have been opened already.

As mentioned above, the air bag is inflated with the gas of high temperature about 150–200° C. discharged from the first gas chamber 1A first. The temperature of the gas falls because of the temperature difference between the gas and air in the cabin, so that the inflated air bag shrinks gradually. This phenomenon occurs regardless of the gas leak from the air bag.

In the air bag inflator 1 according to the first embodiment, after the gas is discharged from the first gas chamber 1A, the shrinkage of the air bag is compensated by the gas from the second gas chamber 1B.

In experiments, wherein the capacity of the first gas chamber 1A was 50 cc; the capacity of the second gas chamber 1B was 30 cc; the start of gas discharge from the second gas chamber 1B was after 0.1 second from the ignition of the initiator assembly 10; and the capacity of the air bag was 15 liters, it was found that the inner pressure of the air bag can be held at 0.3–0.6 kgf/cm$^2$ for about 5–7 seconds. Therefore, the ability for protecting the occupant can be improved.

Figure 2:
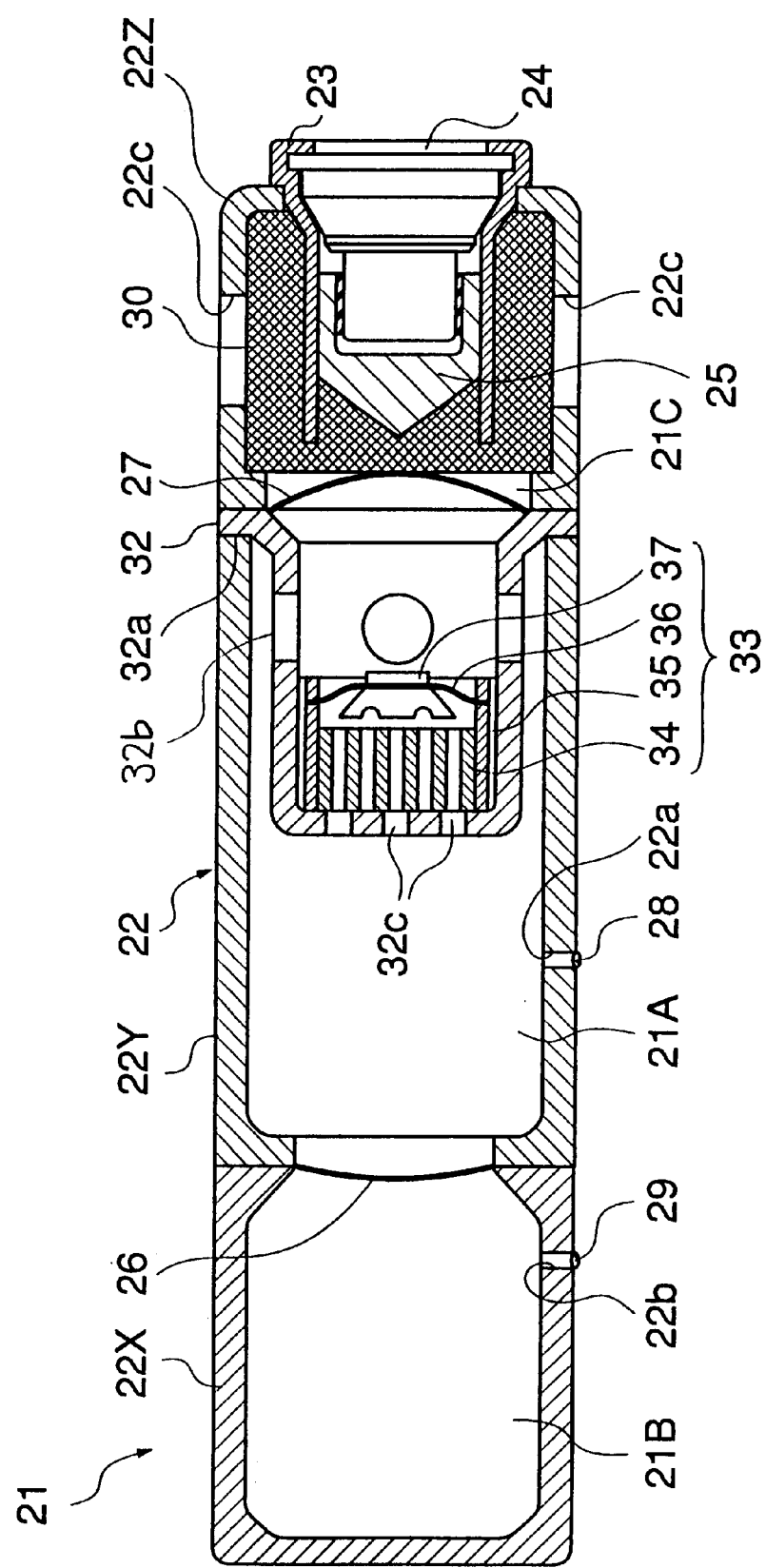
FIG. 2 is a sectional view of an air bag inflator of a piston type according to a second embodiment of the present invention.

FIG. 2 is a sectional view of an air bag inflator 21 of a piston type as a second embodiment of the present invention. The air bag inflator 21 comprises a body 22 having a space formed therein in which gas is filled and sealed. The body 22 has a cylindrical profile, and comprises three parts 22X, 22Y and 22Z arranged in the longitudinal direction. The left part 22X is a cylinder integrally formed with a bottom which is a left end wall of the body 22. The middle part 22Y and the right part 22Z are both open tubular cylinders. These three parts are arranged such that the ends of the middle part 22Y contact the ends of the adjacent parts, and are connected by welding along the outer peripheries. Each welded portion has flange portions projecting inwardly. The right end of the body 22 is open and a sleeve 23 is inserted into the right end. The sleeve 23 is formed in a cylindrical shape and has an initiator assembly 24 fixed to the inside thereof. As mentioned above in the first embodiment, when a vehicle comes into collision, the initiator assembly 24 receives an electric signal from a sensor (not shown) to ignite.

Assembled in the initiator assembly 24 is a piston 25 having a cone-shaped end, which is disposed in such a manner that the piston 25 can slide in the leftward direction in this drawing to Although the piston 25 normally stays in a right position in the sleeve 23, the piston 25 can be pressed by a high pressure gas generated at the time of ignition of the initiator assembly 24, so as to project toward the left of the body 22. The body 22 is sealingly closed at the right side by the sleeve 23 and the initiator assembly 24.

Disk closures 26, 27 are disposed between the left part 22X and the middle part 22Y, and between the middle part 22Y and the right part 22Z, respectively, inside the body 22.

The disk closures 26, 27 are thin metal sheets, i.e. stainless steel with the thickness of 0.4 mm. The disk closures 26, 27 are sandwiched between the ends of the parts of the body 22, and fixed by well-known means, such as welding. The inside of the body 22 is divided in three chambers by the disk closures 26, 27. Among the three chambers, gas is filled and sealed in a first gas chamber 21A positioned in the middle and in a second gas chamber 21B positioned on the left side of the first gas chamber 21A via the disk closure 26. The gas is an inert gas, such as argon and helium, having high pressure in about 200–300 $kgf/cm^2$.

The body 22 is provided with injection holes 22a, 22b allowing the outside of the body 22 to communicate with the first and second gas chambers 21A, 21B, respectively. The high-pressure gas is injected through the injection holes 22a, 22b. Practically, the gas is injected at the same time in order not to cause pressure difference between the first gas chamber 21A and the second gas chamber 21B. Fitted in the injection holes 22a, 22b are steel balls 28, 29. After filling the gas, the steel balls 28, 29 are fitted in the injection holes 22a, 22b so as to close the injection holes 22a, 22b to seal the gas.

The aforementioned sleeve 23 is disposed in a chamber 21C adjacent the first gas chamber 21A via the disk closure 27. Communication or discharge holes 22c are formed in the peripheral wall of the chamber 21C to communicate between the outside of the body 22 and the chamber 21C. Four communication holes 22c are formed at predetermined intervals in the circumferential direction of the body 22. A screen 30 which is made of a metal mesh material is disposed between the outer surface of the sleeve 23 and the inner surface of the body 22. Similar to the screen 15 mentioned above, the screen 30 is used for capturing cinders of the enhancer and fragments of the disk closures.

In the first gas chamber 21A, an enhancer holder 32, an axial section of which has a groove-like shape, is disposed near the disk closure 27. The enhancer holder 32 has a flange 32a integrally fixed to the body 22 by well-known means, such as welding. In this fixed state, the enhancer holder 32 is open toward the chamber 21C. Communication holes 32b are formed in the wall of the enhancer holder 32 to extend radially. Four communication holes 32b are formed at predetermined intervals in the circumferential direction of the enhancer holder 32. Three through holes 32c are formed in the bottom, i.e. left side wall in FIG. 2, of the enhancer holder 32 to extend in the axial direction.

Disposed on a bottom side of the enhancer holder 32 is an enhancer unit 33 which includes an enhancer (gas generating agent) 34 therein. On both sides of the enhancer 34, holders 35 are disposed to contact the inner surface of the enhancer holder 32. A spring 36 is disposed between the holders 35 in its tensioned state. An actuator 37 is attached to the spring 36 so that the actuator 37 is normally biased toward the right of this drawing in a direction away from the enhancer 34 because of the elasticity of the spring 36. The actuator 37 is pressed by the piston 25 which projects by the ignition of the initiator assembly 24 and thus collides with the enhancer 34. By the impact of this collision, the enhancer 34 is ignited.

The description will now be made as regard to the operation of the air bag inflator 21 of the piston type structured as mentioned above.

When the vehicle comes into collision, the sensor (not shown) senses the collision and outputs an electric signal to the initiator assembly 24. Because of this electric signal, the initiator assembly 24 operates. The operation of the initiator assembly 24 applies thrust force on the piston 25. The piston 25 subjected to the thrust force slides in the direction away from the initiator assembly 24 and then collides with the disk closure 27. Because of the collision of the piston 25, the disk closure 27 is torn.

As the disk closure 27 is torn, the gas filled and sealed in the first gas chamber 21A at high pressure is introduced into the enhancer holder 32 through the communication holes 32b. The gas is then discharged into the air bag via the screen 30 through the communication holes 22c formed in the body 22 so as to deploy the air bag.

After the disk closure 27 is torn, the piston 25 further moves toward the left away from the sleeve 23 and then collides with the actuator 37. Because of this collision, the spring 36 is elastically deformed to allow the actuator 37 to collide with the enhancer 34. The enhancer 34 is ignited due to the collision and the high temperature gas is generated and introduced into the first gas chamber 21A via the holes 32c. Therefore, the residual gas in the first gas chamber 21A is increased in its temperature and expands.

Since the residual gas in the first gas chamber 21A is increased in its temperature and expands, the gas is also discharged into the air bag through the communication holes 32b in the wall of the enhancer holder 32 and the communication holes 22c of the body 22. As the gas is discharged from the inside of the first gas chamber 21A, pressure difference occurs between the inside of the first gas chamber 21A and the inside of the second gas chamber 21B, in which gas is filled and sealed, adjacent the first gas chamber 21A. When this pressure difference exceeds a predetermined value, the disk closure 26 is torn. As the disk closure 26 is torn, the gas within the second gas chamber 21B is discharged into the air bag through the communication holes 32b in the wall of the enhancer holder 32 and the communication holes 22c of the body 22. Therefore, the shrinkage of the air bag is compensated by the gas from the second gas chamber 21B.

In this manner, in the air bag inflator 21 of the piston type according to the second embodiment, after the gas in the first gas chamber 21A is discharged, the shrinkage of the air bag can be compensated by the gas in the second gas chamber 21B. In this case also, the inner pressure of the air bag can be held at 0.3–0.6 $kgf/cm^2$ for about 5–7 seconds.

In the above embodiments, two gas chambers are formed in the air bag inflator. However, it is possible to form more than two gas chambers sequentially discharging a gas.

As described above, according to the present invention, the shrinkage of the air bag, which is caused by the temperature fall of the gas discharged from the first high-pressure gas chamber and/or air vent through a vent hole, can be compensated by supplying another gas, so that the deployment pressure, e.g. 0.3–0.6 $kgf/cm^2$, of the air bag can be held for a long period of time, e.g. 5–7 seconds. This can improve the performing ability of, for example, a side air bag, for protecting the occupant.

While the invention has been explained with reference to the specific embodiments of the invention, the explanation is illustrative and the invention is limited only by the appended claims.

What is claimed is:

1. An air bag inflator for discharging gas for deploying an air bag comprising:
   a plurality of pressurized gas chambers including first and second pressurized gas chambers containing pressurized gases,
   an initiator situated at one side of the first gas chamber, said initiator being actuated to discharge the gas contained in the first gas chamber; and means for detecting a pressure difference between the first gas chamber and the second gas chamber and for discharging the gas in the second gas chamber sequentially after discharging the gas in the first gas chamber by breaking a seal of the second gas chamber due to the pressure difference.

2. An air bag inflator according to claim 1, wherein said means is a disk closure disposed between the first gas chamber and the second gas chamber as the seal, said disk closure being torn when it is subjected to a predetermined pressure difference.

3. An air bag inflator according to claim 2, wherein said first gas chamber has a seal at a side of the initiator, said seal being broken when the initiator is actuated.

4. An air bag inflator according to claim 3, wherein said first gas chamber includes a plurality of discharge holes for discharging the gas in the inflator, and closures for closing the discharge holes so that when the initiator is actuated, a gas pressure in the first gas chamber is increased to break the closures to thereby eject the gas outwardly through the discharge holes.

5. An air bag inflator according to claim 4, wherein said initiator includes a gas generating agent so that when the gas generating agent is actuated, the seal is torn to increase the gas pressure in the first gas chamber.

6. An air bag inflator according to claim 3, further comprising an initiator chamber situated adjacent to the first gas chamber near the seal for receiving the initiator therein and having discharge holes, and an enhancer unit disposed in the first gas chamber near the seal and having an enhancer holder and a gas generating agent situated in the enhancer holder so that when the initiator is actuated, the seal is broken and the gas generating agent in the enhancer holder is actuated to thereby release the gas in the first gas chamber outwardly through the discharge holes.

7. An air bag inflator according to claim 6, wherein said initiator includes a piston so that when the initiator is actuated, the piston is moved to break the seal and to actuate the gas generating agent in the enhancer holder.

8. An air bag inflator according to claim 7, wherein said enhancer holder includes side holes for ejecting the gas in the first gas chamber to the initiator chamber, and bottom holes to eject a gas generated by the gas generating agent in the enhance holder to the first gas chamber.

* * * * *